United States Patent [19]

Sarrazin

[11] Patent Number: 4,869,113

[45] Date of Patent: Sep. 26, 1989

[54] METHOD FOR CALIBRATING APPLIANCES FOR THE MEASUREMENT OF FORCE OR MOMENT AND APPLIANCES RELATING TO SAID METHOD

[75] Inventor: Michel Sarrazin, Massingy, France

[73] Assignee: SEB S.A., Selongey, France

[21] Appl. No.: 269,758

[22] Filed: Nov. 10, 1988

[30] Foreign Application Priority Data

Nov. 20, 1987 [FR] France .................... 87 16085

[51] Int. Cl.$^4$ .......................... G01L 1/22; G01L 1/26
[52] U.S. Cl. .................... 73/862.67; 73/1 B; 177/211
[58] Field of Search ........... 73/1 R, 862.04, 862.65, 73/862.67, 765; 177/211, 229

[56] References Cited

U.S. PATENT DOCUMENTS

| | | | |
|---|---|---|---|
| 4,565,255 | 1/1986 | Sarrazin | 177/211 |
| 4,637,263 | 1/1987 | Fritz et al. | 73/862.04 |
| 4,640,139 | 2/1987 | Fritz | 73/862.04 |
| 4,657,097 | 4/1987 | Griffen | 73/862.66 |
| 4,726,436 | 2/1988 | Fukuyama et al. | 177/211 |

FOREIGN PATENT DOCUMENTS 0141710 5/1985 European Pat. Off. .
1045685 12/1958 Fed. Rep. of Germany .
2540990 8/1984 France .
WO84/02186 6/1984 PCT Int'l Appl. .

*Primary Examiner*—Charles A. Ruehl
*Attorney, Agent, or Firm*—Young & Thompson

[57] ABSTRACT

In order to calibrate an appliance for measuring force or moment, the measuring element (1) carries a strain gage bridge ($R_1$, $R_2$, $R_3$, $R_4$) for delivering a signal which is mainly sensitive to the force or to the moment to be measured and is provided at the time of manufacture with two other strain-gage bridges ($R_5$, $R_6$, $R_7$, $R_8$); ($R_9$, $R_{10}$, $R_{11}$, $R_{12}$) for delivering signals which are mainly sensitive to two parasitic stresses other than the force or the moment to be measured. In a first stage, the method consists in measuring the signals delivered by the three strain-gage bridges in the absence of any load applied on the measuring element, then under a number of known reference loads chosen from among those to which each strain-gage bridge is the most sensitive. In a second stage, the reference measurements are used as a basis for calculating the parameters of sensitivity according to which each of the signals delivered by the measuring bridges is a function of the applied loads. In a third stage, these parameters of sensitivity are used as a basis for calculating the correction to be made in the force or the moment measured by the first strain-gage bridge ($R_1$, $R_2$, $R_3$, $R_4$).

13 Claims, 2 Drawing Sheets

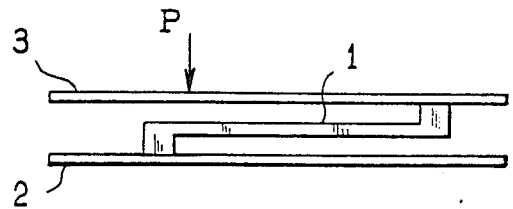
FIG_1
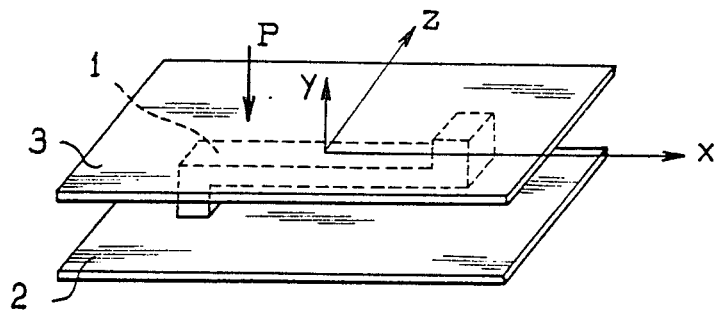
FIG_2
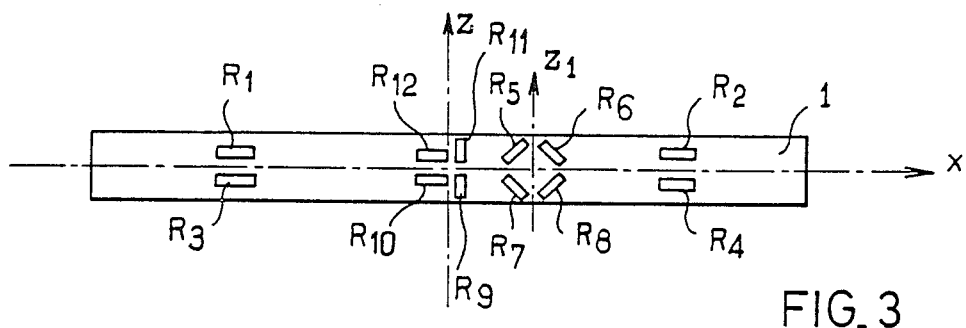
FIG_3
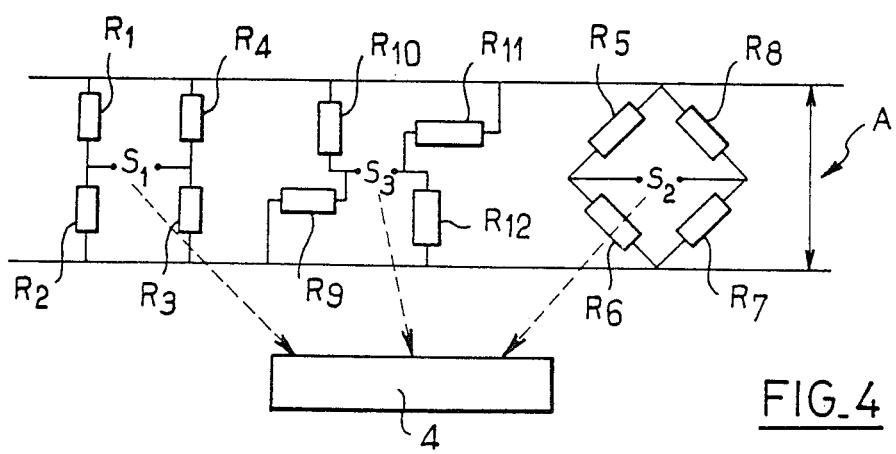
FIG_4

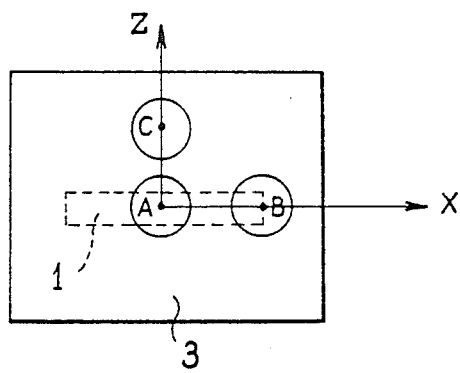
FIG_5
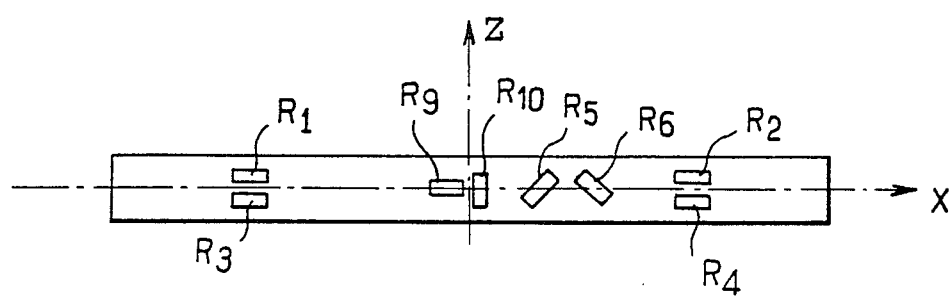
FIG_6
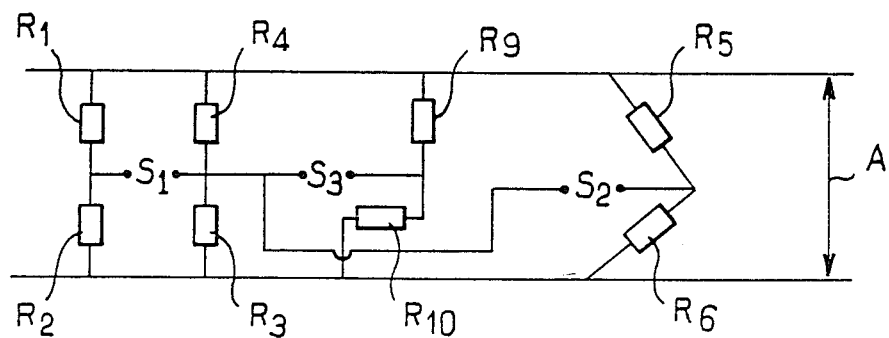
FIG_7

METHOD FOR CALIBRATING APPLIANCES FOR THE MEASUREMENT OF FORCE OR MOMENT AND APPLIANCES RELATING TO SAID METHOD

BACKGROUND OF THE INVENTION

1. Field of the Invention

The present invention relates to a method for calibrating by calculation appliances for the measurement of force or moment which comprise a fixed base, a load platform on which is applied the force or the moment to be measured, and a measuring element inserted at one end in the fixed base and at the other end in the load platform and instrumented as a sensor.

The invention is also directed to appliances which are calibrated in this manner.

Appliances of this type are employed in particular for weighing (scales for weighing persons, scales for weighing food products, scales of other types) or for the measurement of torque.

2. Description of the Prior Art

In these appliances, the measuring element which usually consists of a bar adapted to carry strain gages is subjected in practice not only to the load (force or moment) to be measured but also to parasitic moments which may result either from imperfections of the equipment (related, for example, to the bar, to the insertion of this latter, to the strain gages and to the arrangement of these latter on the bar) or from an imperfection in the mode of application of the load to be measured (for example a load placed on the platform of a weighing device produces parasitic twisting or bending moments according to its position on the platform).

In these devices, the gages carried by the bar are connected electrically in a measuring bridge for delivering a signal which is sensitive to these parasitic moments. Said signal therefore has parasitic components which impair the accuracy of measurement of the force or moment to be measured.

In order to overcome this drawback, a number of technical solutions are already known and applied.

In a first known solution, the measuring element is adjusted by removal of material at a judiciously chosen point of the strain gages in order to modify the angle formed between the electrical direction of the gages and the longitudinal axis of the measurement body or in other words of the bar.

This solution has a disadvantage in that it cannot readily be expressed in an automatic application algorithm, calls for empirical interpretation of faults, highly qualified personnel and very costly means.

In accordance with another method, there are added to the strain-gage bridge for measurement of the load (force or moment) to be measured additional or adjusting gages for correcting the effect of parasitic loads.

In accordance with French Patent No. 2,554,229, provision is made for an arrangement of strain gages on the bar of a weighing device which makes it possible to read on the one hand a signal which is mainly proportional to the weight applied on the bar but is affected by parasitic components generated by the moments along the axis of the bar and along an axis perpendicular to this latter and on the other hand two signals which are mainly proportional to each of these two moments. It is then possible to reinject in the signal which is mainly proportional to the weight part of the signals which are mainly proportional to the two moments aforesaid, namely that part which is necessary for compensating and cancelling the parasitic components of the main signal.

The solutions described in the foregoing are based on the same approach which consists in materially modifying the measuring element, namely the bar with its strain gages, so as to make said element sensitive solely to the load (force or moment) to be measured and insensitive to parasitic loads. In consequence, these solutions are all subject to the same drawback since it is necessary after manufacture to take each weighing apparatus in hand again for a modification which is specific to that apparatus (such as, for example, welding of additional components, cutting of tracks of certain gages, and so on). These operations are both time-consuming and costly.

The aim of the present invention is to circumvent all these disadvantages by means of a method of calibration which no longer calls for any material intervention of the measuring element after manufacture of this latter and which can be fully automated.

SUMMARY OF THE INVENTION

In accordance with the invention, the method for calibrating an appliance for the measurement of force or of moment comprising a measuring element which includes a strain-gage bridge for delivering a signal which is mainly sensitive to the force or to the moment to be measured, is distinguished by the fact that the measuring element is provided at the time of manufacture with two other strain-gage bridges which are independent of each other and with respect to the first bridge so as to deliver signals which are mainly sensitive to two parasitic stresses other than the force or the moment to be measured. The method consists in a first stage in measuring the signals delivered by the three strain-gage bridges in the absence of any load applied on the measuring element and then in a number of known load positions chosen from among those to which each strain-gage bridge is the most sensitive. The method further consists, in a second stage, in calculating from the aforesaid reference measurements the sensitivity parameters according to which each signal delivered by the measuring bridges is a function of the applied loads and, in a third stage, in calculating from these parameters of sensitivity the correction to be made in the force or in the moment measured by the first strain-gage bridge.

Experience and calculation in fact show that, when a measuring element such as a bar, for example, is equipped with a plurality of strain-gage bridges in accordance with the invention, the signal delivered by each strain-gage bridge is a linear function of the various loads applied and the parameter of each term of the equation represents the sensitivity of said strain-gage bridge to a given force or moment.

In the appliance as manufactured, an adequate number of suitably chosen reference measurements makes it possible to calculate all the parameters of sensitivity by solving a system of linear equations.

Without any material intervention on the measuring element, it is then possible at each fresh measurement to calculate the true value of the load (force or moment) to be measured by solving in this case a system of linear equations in which all the parameters (the sensitivities) are now known as well as the first expressions (the signals), and in which the load to be measured is one of the unknowns.

This method can be fully automated. The calculations to be performed are in fact sufficiently simple to permit processing by a computing unit such as a microprocessor integrated with the appliance, in which it is only necessary to write in memory the parameters resulting from the reference measurements.

Said method permits corrections which are sufficiently accurate for industrial or domestic measurements.

For example, in the case of instruments for the measurement of force usually consisting of weighing devices (scales for weighing persons, food products or scales of other types) and equipped with a load platform, the signal delivered by a strain-gage bridge attached to the measuring bar is a linear function of the force P to be measured and of the position in which the force is applied on the platform as defined by its coordinates X and Z. This signal S is of the form:

$$S = aP + bPX + cPZ + d$$

Taking this into account, by equipping the bar with three strain-gage bridges having adequate orientations, that is, a first strain-gage bridge which is mainly sensitive to the force P to be measured, a second strain-gage bridge which is mainly sensitive to the torsional stress resulting from the transverse moment PZ generated by the relative displacement of the point of application of the force P with respect to the longitudinal axis of the bar, and a third strain-gage bridge which is mainly sensitive to the bending stress resulting from the longitudinal moment PX generated by the position of the point of application of the force P in the longitudinal axis of the bar with respect to its central point, it is only necessary to perform a no-load measurement (which provides the three parameters $d_i$) and three reference measurements under load in order to determine all the nine parameters (sensitivities) $a_i$, $b_i$ and $c_i$ by solving a linear system of nine equations having nine unknowns.

Thereafter, at each measurement of a force, the computation unit will have to solve only a linear system of three equations having three unknowns in order to calculate the true value of the force P as a function of the three measured signals.

The method set forth above in its most general form can be simplified in practical cases by choosing the reference measurements which are the most adequate according to the characteristics of the strain-gage bridges and by expressing the computation equations in acceptable simplified forms according to the degree of accuracy which is desired for the measurement.

As will be readily apparent, the foregoing can be transposed from the case of measurement of a force to the case of measurement of a moment, with the effect of parasitic forces or moments.

The invention is also directed to an appliance for measuring a force comprising means for the practical application of the method of calibration in accordance with the invention.

According to this aspect of the invention, said appliance comprising a fixed base, a platform for receiving the force P to be measured and a bar inserted at one end in the fixed base and at the other end in the load platform, said bar being provided with a strain-gage bridge which is mainly sensitive to the force to be measured, is distinguished by the fact that it comprises in addition a second strain-gage bridge which is mainly sensitive to the torsional stress resulting from the transverse moment PZ generated by the displacement of the point of application of the force P with respect to the longitudinal axis of the bar, and a third strain-gage bridge which is mainly sensitive to the bending stress resulting from the longitudinal moment PX generated by the position of the point of application of the force P in the longitudinal axis of the bar with respect to its central point, that the appliance further comprises means for measuring the three signals delivered by the three strain-gage bridges in the absence of any force applied on the platform and for measuring a known reference force applied successively at three points of the platform having known positions, means for calculating, by solving the system of nine linear equations thus obtained by means of said reference measurements, the nine parameters of sensitivity according to which each of the three signals is a function of the force P and of the applied moments PX and PZ, and means for calculating from said parameters of sensitivity the correction to be made in the force P measured by the first strain-gage bridge.

BRIEF DESCRIPTION OF THE DRAWINGS

FIG. 1 is a schematic longitudinal sectional view of a weighing appliance in accordance with the invention.

FIG. 2 is a perspective view of said appliance.

FIG. 3 is a plan view of the arrangement of the three strain-gage bridges on the top face of the bar of the appliance.

FIG. 4 is the diagram of electrical connection of said strain gages.

FIG. 5 is a schematic plan view of the preferable positions of the reference load for the three calibration measurements under load.

FIG. 6 is a plan view of the arrangement of three strain-gage half-bridges in accordance with a simplified embodiment of the invention.

FIG. 7 is a diagram of electrical connection of said strain gages.

DESCRIPTION OF THE PREFERRED EMBODIMENTS

A weighing appliance as illustrated schematically in FIGS. 1 and 2 has a measuring element which consists of a resilient bar 1 of steel, for example, one end of which is inserted in a fixed base 2 and the other end of which is inserted in the load platform 3.

The weight P to be measured is placed on the platform 3 at a point located by its coordinates X, Z in a system of orthogonal axes XYZ in which the axis X coincides with the longitudinal axis of the bar 1.

The bar 1 is subjected to a number of combined stresses: the vertical force P and the moments PX (longitudinal bending moment) and PZ (transverse torsional moment) which it generates.

The top face of the bar 1 is equipped with three strain-gage bridges disposed as indicated in FIG. 3 and connected electrically as shown in FIG. 4.

The bar 1 comprises a first bridge of strain gages $R_1$, $R_2$, $R_3$, $R_4$ constituted by two pairs $R_1$, $R_3$; $R_2$, $R_4$ disposed symmetrically with respect to the longitudinal median axis X and with respect to the transverse median axis Z of the bar 1.

These four strain gages $R_1$, $R_2$, $R_3$, $R_4$ are connected to an electrical supply A and the measuring bridge formed by these latter delivers an electric signal $S_1$ as indicated in FIG. 4.

Said bridge of strain gages $R_1$, $R_2$, $R_3$, $R_4$ is mainly sensitive to the weight P to be measured. However, it is also sensitive to a lesser extent to the parasitic moments PX and PZ.

The signal $S_1$ delivered by said strain-gage bridge is of the form:

$$S_1 = a_1P + b_1PX + c_1PZ + d_1$$

where:

$d_1$ is the offset signal resulting in particular from electrical imperfection of the bridge and from the intrinsic weight of the elements of the appliance;

$a_1$, $b_1$, $c_1$ are the parameters of sensitivity of the bridge to each stress: $b_1$ and $c_1$ are of small value with respect to $a_1$.

The bar 1 is equipped with a second bridge of strain gages $R_5$, $R_6$, $R_7$, $R_8$ which are inclined to the axis X at 45° and disposed symmetrically with respect to said axis and with respect to an axis $Z_1$ which is parallel to the axis Z.

The aforementioned bridge of strain gages $R_5$, $R_6$, $R_7$, $R_8$ is mainly sensitive to the transverse torsional moment PZ.

Said strain gages are located as close as together as possible so as to ensure that the bridge has low sensitivity to displacement of the weight P along the axis X. These gages are connected to the supply A and the bridge formed by said gages delivers a signal $S_2$ of the form:

$$S_2 = a_2P + b_2PX + c_2PZ + d_2$$

where $d_2$ is the value of the offset signal and $a_2$, $b_2$, $c_2$ are the parameters of sensitivity of the bridge to each stress.

The bar 1 is equipped with a third bridge of strain gages $R_9$, $R_{10}$, $R_{11}$, $R_{12}$ disposed in pairs on each side of the axis X and of the axis Z. The electrical direction of the strain gages $R_{10}$ and $R_{12}$ is parallel to the axis X whilst the electrical direction of the gages $R_{11}$ and $R_9$ is perpendicular to the axis X or in other words parallel to the axis Z. This third strain-gage bridge is mainly sensitive to the longitudinal bending moment PX.

The three strain-gage bridges aforesaid are independent of each other. In other words, there does not exist any electrical connection between them.

In order to make this bridge sensitive to PX, the operation involves the sum of bending moments (and not the difference as in the case of the first point). The strain gages $R_{10}$, $R_{12}$ are subjected to the effect of the bending moment and the gages $R_9$ and $R_{11}$ are subjected to the Poisson effect.

Said third bridge delivers a signal $S_3$ of the form:

$$S_3 = a_3P + b_3PX + c_3PZ + d_3$$

where $d_3$ is the offset signal and $a_3$, $b_3$ and $c_3$ are the parameters of sensitivity of the bridge to each stress.

In order to calibrate the measuring appliance described in the foregoing, four calibration measurements are carried out as follows: the first operation consists in performing a measurement of the three offset signals $S_1$, $S_2$, $S_3$, that is, without any weight on the platform 3. This measurement gives the values $d_1$, $d_2$ and $d_3$; the next operation consists in carrying out three measurements with a known weight of reference Pr which is placed on the platform 3 successively in three known positions A, B, C defined by the coordinates $X_A$, $Z_A$; $X_B$, $Z_B$; and $X_C$, $Z_B$ such that:

$A(X_A, Z_A)$, $B(X_B, Z_B)$, $C(X_C, Z_C)$

There are thus measured the nine signals given below:

$$S_{1A} = a_1P + b_1 PX_A + c_1 PZ_A + d_1$$
$$S_{2A} = a_2P + b_2 PX_A + c_2 PZ_A + d_2$$
$$S_{3A} = a_3P + b_3 PX_A + c_3 PZ_A + d_3$$

$$S_{1B} = a_1P + b_1 PX_B + c_1 PZ_B + d_1$$
$$S_{2B} = a_2P + b_2 PX_B + c_2 PZ_B + d_2$$
$$S_{3B} = a_3P + b_3 PX_B + c_3 PZ_B + d_3$$

$$S_{1C} = a_1P + b_1 PX_C + c_1 PZ_C + d_1$$
$$S_{2C} = a_2P + b_2 PX_C + c_2 PZ_C + d_2$$
$$S_{3C} = a_3P + b_3 PX_C + c_3 PZ_C + d_3$$

The resolution of this linear system of nine equations having nine unknowns makes it possible to calculate the nine parameters (sensitivities) $a_i$, $b_i$, $c_i$. They are written in the memory of the computation unit 4 such as a microprocessor which is integrated in the measuring appliance (see FIG. 4).

Subsequently, in order to measure an unknown weight P placed at an unknown point X, Z (or not known with accuracy) of the platform 3, the appliance measures the three signals $S_1$, $S_2$, $S_3$. We then have the following system of three equations:

$$a_1 P + b_1 PX + c_1 PZ + d_1 = S_1$$

$$a_2 P + b_2 PX + c_2 PZ + d_2 = S_2$$

$$a_3 P + b_3 PX + c_3 PZ + d_3 = S_3$$

The method of determinants given below:

$$\begin{vmatrix} a_1 & b_1 & c_1 \\ a_2 & b_2 & c_2 \\ a_3 & b_3 & c_3 \end{vmatrix} \times \begin{vmatrix} P \\ X \\ Z \end{vmatrix} = \begin{vmatrix} S_1 - d_1 \\ S_2 - d_2 \\ S_3 - d_3 \end{vmatrix} = \begin{vmatrix} S'_1 \\ S'_2 \\ S'_3 \end{vmatrix}$$

makes it possible to calculate P, X and Z.

This calculation can be performed by means of the microprocessor 4 which is integrated in the appliance. This method makes it possible to calculate not only the exact value of the weight P applied on the platform 3 but also its true position on said platform.

In the foregoing discussion, the method has been set forth in its most general form.

In practice, the application of the method is simplified by first choosing reference measurements which simplify the equations and the calculations.

Thus in order to avoid the need to solve a system of nine equations for the purpose of calculating the nine parameters $a_i$, $b_i$, $c_i$, there will be chosen for example the positions of the three reference measurements under load as shown in FIG. 5, namely as follows:

Position A: $X = Z = 0$: a measurement is performed on the three signals $S_{iA}$ which give the values $$a_i = \frac{S_{iA} - d_i}{Pr}$$

Position B: $X = 0$ $Z = 0$: a measurement is performed on the three signals $S_{iB}$ which in this case give the values $$b_i = \frac{S_{iB} - d_i - a_i Pr}{XPr}$$

Position C: X=0 Z≠0 : a measurement is performed on the three signals $S_{iC}$ which in this case give the values $$c_i = \frac{S_{iC} - d_i - b_i Pr}{ZPr}$$

In order to increase the accuracy, it is also possible to split up each of these latter into:

B: X≠0 Z=0 and B': −X≠0 Z=0
whence $$b_1 = \frac{S_{iB} - S_{iB'}}{2XPr}$$

C: X=0 Z=0 and C': X=0 −Z=0
whence $$c_1 = \frac{S_{iC} - S_{iC'}}{2ZPr}$$

which eliminates the errors relating to the values $d_i$ from the calculation of the parameters $A_i$, $b_i$, $c_i$.

These positions of Pr in respect of the calibration measurements have been chosen so as to nullify successively the values PrX and PrZ.

There is no longer any system of equations to be solved and the calibration then requires only very simple calculations which give the values $a_i$, $b_i$, $c_i$.

In order to measure subsequently an unknown weight P, it is also possible to simplify the calculations by postulating that the term in PX of the signal $S_2$ (mainly sensitive to the transverse torsional moment PZ) is negligible and that the term in PZ of the signal $S_3$ (mainly sensitive to the longitudinal moment PX) is negligible. The system of three equations having three unknown (PXZ) to be solved then becomes:

$$S_1 = a_1 P + b_1 PX + c_1 PZ + d_1$$
$$S_2 = a_2 P + c_2 PZ + d_2$$
$$S_3 = a_3 P + b_3 PX + d_3$$

Finally, instead of solving this system of three equations having three unknowns by the strict method of determinants, it is also possible to proceed by approximations, for example as follows:

a first approximate value of the unknown P is estimated at $$Pe = \frac{S_1 - d_1}{a_1}$$

the approximate values of X and Z are then estimated by $$Xe = \frac{S_3 - a_3 Pe - d_3}{b_3 Pe}$$

$$\text{and } Ze = \frac{S_2 - a_2 Pe - d_2}{c_2 Pe}$$

a more precise value of P is then recalculated $$P = \frac{S_1 - b_1 PeXe - c_1 PeZe - d_1}{a_1}$$

Experience has shown that, even with this highly simplified method of calculation by approximation, the corrections are sufficiently accurate for balances of 750 points defined in accordance with French standards of Class IV.

The advantage is that the calculations can be performed by low-capacity microprocessors.

The foregoing description consequently shows that calibration of the measuring appliance in accordance with the invention no longer calls for any subsequent intervention on the strain gages applied on the bar 1 which consists in modifying these latter.

The bar 1 is equipped once and for all with strain gages which make it possible to calibrate the appliance by means of measurements of initial signals and calculations which can be performed automatically by means of a microprocessor.

As will be readily apparent, the arrangement of the three strain-gage bridges shown in FIGS. 3 and 4 is given solely by way of example. The advantage of the arrangement illustrated is that all the strain gages are located on the same face of the bar 1 and can be positioned at the time of manufacture on one and the same dielectric support which can be readily applied in a single operation in the longitudinal direction of the bar 1.

FIGS. 6 and 7 show a further possibility of more economical construction by means of half-bridges instead of complete bridges.

In this simplified embodiment, the strain gages $R_1$, $R_2$, $R_3$, $R_4$ of the first bridge which is mainly sensitive to the weight P and delivers the signal $S_1$ have the same arrangement as in FIG. 3.

The second bridge which is sensitive to the position at Z and delivers the signal $S_2$ has only two strain gages $R_5$, $R_6$ which are inclined to the axis X at 45° and displaced with respect to the axis Z.

The third bridge which is sensitive to the position at X and delivers the signal $S_3$ has only two strain gages $R_9$, $R_{10}$ placed on each side of the axis Z, the electrical direction of one gage $R_9$ being parallel to the axis X and the electrical direction of the other gage $R_{10}$ being perpendicular to said axis X.

FIG. 6 shows how these three strain-gage bridges are connected electrically to the supply A.

It is also readily apparent that the shape of the bar as illustrated in FIGS. 1 and 2 is only one example. The method is also applicable to measuring elements of any other shape since it is based on the numerical resolution of systems of equations in which the parameters (sensitivities) do not have to be defined by explicit expressions as a function of the geometrical and mechanical characteristics of the measuring element but will be calculated as a function of the signals delivered to the calibration measurements.

Finally, the entire description given in the foregoing has dealt with the example of measurement of a force (precisely a weight). The method can also be applied to measurement of a moment.

Furthermore, the first strain-gage bridge can be limited to two gages and the second and third bridges can be limited to a single gage associated with fixed resistors which are insensitive to deformations of the bar.

What is claimed is:

1. A method for calibrating an appliance for the measurement of force or of moment comprising a measuring element (1) which includes a strain-gage bridge ($R_1$, $R_2$, $R_3$, $R_4$) for delivering a signal which is mainly sensitive to the force or to the moment to be measured, wherein the measuring element (1) is provided at the time of manufacture with two other strain-gage bridges ($R_5$, $R_6$, $R_7$, $R_8$); ($R_9$, $R_{10}$, $R_{11}$, $R_{12}$) which are independent of each other and with respect to the first bridge so as to deliver signals which are mainly sensitive to two parasitic stresses other than the force or the moment to be measured, wherein the method consists in a first stage in measuring the signals delivered by the three strain-gage bridges in the absence of any load applied on the measuring element and then in a number of known reference load positions chosen from among those to which each strain-gage bridge is the most sensitive, in a second stage in calculating from the aforesaid reference measurements the parameters of sensitivity according to which each signal delivered by the measuring bridges is a function of the applied loads, and in a third stage in calculating from these parameters of sensitivity the correction to be made in the force or in the moment measured by the first strain-gage bridge ($R_1$, $R_2$, $R_3$, $R_4$).

2. A method for calibrating an appliance for the measurement of a force which comprises a fixed base (2), a load platform (3) on which the force (P) to be measured is applied, and a bar (1) inserted at one end in the fixed base and at the other end in the load platform, said bar (1) being provided with a first strain-gage bridge ($R_1$, $R_2$, $R_3$, $R_4$) which is mainly sensitive to the force (P) to be measured, a second strain-gage bridge ($R_5$, $R_6$, $R_7$, $R_8$) which is mainly sensitive to the torsional stress resulting from the transverse moment (PZ) generated by the displacement of the point of application of the force (P) with respect to the longitudinal axis of the bar (1), and a third strain-gage bridge ($R_9$, $R_{10}$, $R_{11}$, $R_{12}$) which is mainly sensitive to the bending stress resulting from the longitudinal moment (PX) generated by the position of the point of application of the force (P) in the longitudinal axis of the bar (1) with respect to its central point, wherein the three strain-gage bridges are independent of each other and wherein said method consists in a first stage in measuring the three signals ($S_1$, $S_2$, $S_3$) delivered by the three bridges first in the absence of any force applied on the load platform (3) then under a known reference force (Pr) applied successively at three points of the platform (3) having known positions, in a second stage in calculating, by solving the system of nine linear equations thus obtained by said reference measurements, the nine parameters of sensitivity according to which each of the three signals is a function of the force (P) and of the applied moments (PX) and (PZ) and, in a third stage, in calculating from these parameters of sensitivity the correction to be made in the force (P) measured by the first strain-gage bridge ($R_1$, $R_2$, $R_3$, $R_4$).

3. A method according to claim 2 wherein, in the third stage, the calculated parameters of sensitivity are written in the memory of a computing unit integrated with the appliance and programmed so as to ensure that, at each measurement of an unknown force (P) which will be subsequently performed, said computing unit automatically calculates the true value of the force (P) to be measured, in real time, as a function of the three signals ($S_1$, $S_2$, $S_3$) delivered by the three strain-gage bridges, and taking into account the effects produced by the parasitic moments (PX) and (PZ).

4. A method according to claim 2 wherein, for the reference measurements, the three successive positions of application of the reference force (Pr) are chosen so as to cancel certain terms of the equations and thus to simplify the calculation of the nine parameters of sensitivity.

5. A method according to claim 2 wherein, in order to calculate the true value of the unknown force (P) to be measured, taking into account the desired degree of accuracy, the system of equations is simplified by disregarding certain terms of small value relative to the others, and calculations are made by approximations.

6. An appliance for measuring a force (P) comprising a fixed base (2), a platform (3) for receiving the force (P) to be measured and a bar (1) inserted at one end in the fixed base and at the other end in the load platform, said bar (1) being provided with a strain-gage bridge ($R_1$, $R_2$, $R_3$, $R_4$) which is mainly sensitive to the force (P) to be measured, wherein said appliance further comprises a second strain-gage bridge ($R_5$, $R_6$, $R_7$, $R_8$) which is mainly sensitive to the torsional stress resulting from the transverse moment (PZ) generated by the displacement of the point of application of the force (P) with respect to the longitudinal axis of the bar (1), and a third strain-gage bridge ($R_9$, $R_{10}$, $R_{11}$, $R_{12}$) which is mainly sensitive to the bending stress resulting from the longitudinal moment (PX) generated by the position of the point of application of the force (P) in the longitudinal axis of the bar (1) with respect to its central point, said three strain-gage bridges being independent of each other, wherein the appliance further comprises means for measuring the three signals ($S_1$, $S_2$, $S_3$) delivered by the three strain-gage bridges in the absence of any force applied on the platform (3) and for measuring a known reference force (Pr) applied successively at three points of the platform (3) having known positions, means for calculating, by solving the system of nine linear equations thus obtained by said reference measurements, the nine parameters of sensitivity according to which each of the three signals is a function of the force (P) and of the moments (PX) and (PZ) applied, and means for calculating from these parameters of sensitivity the correction to be made in the force (P) measured by the first strain-gage bridge ($R_1$, $R_2$, $R_3$, $R_4$).

7. An appliance according to claim 6, wherein the computing means comprise a microprocessor including a memory which is capable of storing the computed parameters of sensitivity, said microprocessor being programmed so as to ensure that, at each measurement of an unknown force (P), it automatically calculates the true value of the force (P) to be measured, as a function of the three signals ($S_1$, $S_2$, $S_3$) delivered by the three strain-gage bridges and taking into account the effects produced by the parasitic moments (PX) and (PZ).

8. An appliance according to claim 7, wherein the microprocessor forms part of the appliance.

9. An appliance according to claim 6, wherein the first strain-gage bridge is constituted by two pairs of strain gages ($R_1$, $R_3$); ($R_2$, $R_4$) disposed symmetrically with respect to the longitudinal median axis (X) and with respect to the transverse median axis (Z) of the bar (1).

10. An appliance according to claim 9, wherein the second strain-gage bridge is constituted by four strain gages ($R_5$, $R_6$, $R_7$, $R_8$) inclined to the axis (X) at 45° and disposed symmetrically with respect to said axis and with respect to an axis ($Z_1$) parallel to the axis (Z).

11. An appliance according to claim 9, wherein the third strain-gage bridge is constituted by two pairs of strain-gages ($R_9$, $R_{10}$) ; ($R_{11}$, $R_{12}$) in which one pair is parallel to the axis (X) whilst the other pair is parallel to the axis (Z).

12. An appliance according to claim 9, wherein the second strain-gage bridge is constituted by two strain gages ($R_5$, $R_6$) inclined to the axis (X) at 45° and displaced with respect to the axis (Z).

13. An appliance according to claim 9, wherein the third strain-gage bridge is constituted by two strain gages ($R_9$, $R_{10}$) disposed on each side of the axis (Z) and respectively parallel and perpendicular to the axis (X).

* * * * *